United States Patent
Koike et al.

(10) Patent No.: US 12,480,011 B2
(45) Date of Patent: *Nov. 25, 2025

(54) RADIATION CURABLE INK JET COMPOSITION AND INK JET METHOD

(71) Applicant: SEIKO EPSON CORPORATION, Tokyo (JP)

(72) Inventors: Naoki Koike, Matsumoto (JP); Toru Saito, Yamagata (JP); Kyohei Tanaka, Matsumoto (JP); Kiyoshi Nakamura, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 52 days.

This patent is subject to a terminal disclaimer.

(21) Appl. No.: 18/484,619

(22) Filed: Oct. 11, 2023

(65) Prior Publication Data

US 2024/0052185 A1 Feb. 15, 2024

Related U.S. Application Data

(63) Continuation of application No. 17/210,611, filed on Mar. 24, 2021, now Pat. No. 11,987,715.

(30) Foreign Application Priority Data

Mar. 25, 2020 (JP) .............................. JP2020-053853

(51) Int. Cl.
*C09D 11/101* (2014.01)
*B41J 2/01* (2006.01)
(Continued)

(52) U.S. Cl.
CPC ............ *C09D 11/101* (2013.01); *B41J 2/2107* (2013.01); *B41J 11/002* (2013.01); *B41M 5/00* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 4,143,013 A  3/1979  Jenkinson et al.
5,331,051 A  7/1994  Ishibashi et al.
(Continued)

FOREIGN PATENT DOCUMENTS

CN  101305060 A  11/2008
CN  101516632 A  8/2009
(Continued)

OTHER PUBLICATIONS www.igmresins.com; Version:009; iGM RESINS—Omnirad TPO-L—Photoinitiator; Product Data Sheet; Issue: Aug. 24, 2017; (3 pp).
(Continued)

*Primary Examiner* — Manish S Shah
(74) *Attorney, Agent, or Firm* — Harness, Dickey & Pierce, P.L.C.

(57) ABSTRACT

A radiation curable ink jet composition includes polymerizable compounds and a photopolymerization initiator, the polymerizable compounds include a monofunctional monomer, a content of the monofunctional monomer with respect to a total mass of the polymerizable compounds is 90 percent by mass or more, and the photopolymerization initiator includes ethyl (2,4,6-trimethylbenzoyl)phenylphosphinate.

14 Claims, 1 Drawing Sheet

(51) Int. Cl.
  *B41J 2/21* (2006.01)
  *B41J 11/00* (2006.01)
  *B41M 5/00* (2006.01)
  *B41M 7/00* (2006.01)
  *C09D 11/102* (2014.01)
  *C09D 11/107* (2014.01)
  *C09D 11/30* (2014.01)
  *C09D 11/38* (2014.01)

(52) U.S. Cl.
  CPC ........ *B41M 5/0023* (2013.01); *B41M 7/0081* (2013.01); *C09D 11/102* (2013.01); *C09D 11/107* (2013.01); *C09D 11/30* (2013.01); *C09D 11/38* (2013.01); *B41J 2/01* (2013.01)

(58) Field of Classification Search
  CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033
  See application file for complete search history.

(56) References Cited

U.S. PATENT DOCUMENTS

| | | | |
|---|---|---|---|
| 6,306,502 B1 | 10/2001 | Fukushima et al. | |
| 6,552,102 B2 | 4/2003 | Poetsch et al. | |
| 8,137,793 B2 | 3/2012 | Kameyama et al. | |
| 8,501,830 B2 | 8/2013 | Selman et al. | |
| 8,564,142 B2 | 10/2013 | Ito et al. | |
| 8,940,813 B2 | 1/2015 | Araki et al. | |
| 9,051,481 B2 | 6/2015 | Yoshino et al. | |
| 9,090,636 B2 | 7/2015 | Carpentier et al. | |
| 9,101,955 B2 | 8/2015 | Araki et al. | |
| 9,855,693 B2 | 1/2018 | Umebayashi | |
| 10,308,824 B2 | 6/2019 | Yoda et al. | |
| 10,563,075 B2 | 2/2020 | Umebayashi | |
| 10,590,297 B2 | 3/2020 | Nakano et al. | |
| 10,767,068 B2 | 9/2020 | Nakashima et al. | |
| 11,912,881 B2 | 2/2024 | Nakashima et al. | |
| 2004/0010052 A1* | 1/2004 | Ishizuka | C09D 11/101 522/75 |
| 2004/0189756 A1 | 9/2004 | Ikezaki et al. | |
| 2006/0066697 A1 | 3/2006 | Inoue | |
| 2006/0268080 A1 | 11/2006 | Nakazawa | |
| 2007/0046719 A1* | 3/2007 | Yamanobe | B41J 11/00212 347/21 |
| 2007/0206045 A1 | 9/2007 | Umebayashi et al. | |
| 2007/0259986 A1 | 11/2007 | Elwakil et al. | |
| 2008/0090929 A1 | 4/2008 | Wilson et al. | |
| 2008/0206527 A1 | 8/2008 | Hayata | |
| 2008/0238980 A1 | 10/2008 | Nagashima et al. | |
| 2009/0117343 A1 | 5/2009 | Nishida et al. | |
| 2009/0197055 A1 | 8/2009 | Yokoi | |
| 2009/0202795 A1 | 8/2009 | Hayata et al. | |
| 2009/0280265 A1 | 11/2009 | Oyanagi et al. | |
| 2009/0289973 A1 | 11/2009 | Makuta et al. | |
| 2010/0068386 A1 | 3/2010 | Kanbe et al. | |
| 2010/0133728 A1 | 6/2010 | Yonezawa et al. | |
| 2010/0233448 A1 | 9/2010 | Kameyama et al. | |
| 2010/0285282 A1 | 11/2010 | Selman et al. | |
| 2011/0069118 A1 | 3/2011 | Ohzeki et al. | |
| 2011/0171677 A1 | 7/2011 | Braslau | |
| 2011/0223391 A1 | 9/2011 | Nishimura et al. | |
| 2011/0242191 A1 | 10/2011 | Mochizuki | |
| 2012/0113201 A1 | 5/2012 | Kagose et al. | |
| 2012/0133059 A1 | 5/2012 | Ito et al. | |
| 2012/0176456 A1 | 7/2012 | Maekawa et al. | |
| 2012/0189822 A1 | 7/2012 | Ito et al. | |
| 2012/0200653 A1 | 8/2012 | Shimohara et al. | |
| 2012/0208915 A1 | 8/2012 | Hayata et al. | |
| 2012/0229583 A1 | 9/2012 | Fukumoto et al. | |
| 2012/0274717 A1 | 11/2012 | Nakano et al. | |
| 2013/0010039 A1 | 1/2013 | Kida et al. | |
| 2013/0025807 A1 | 1/2013 | Wernersson et al. | |
| 2013/0260092 A1 | 10/2013 | Araki et al. | |
| 2013/0286120 A1 | 10/2013 | Kobayashi et al. | |
| 2013/0295342 A1 | 11/2013 | Araki et al. | |
| 2014/0022299 A1* | 1/2014 | Yokoi | C09D 11/101 524/590 |
| 2014/0292962 A1 | 10/2014 | Nakano et al. | |
| 2014/0362151 A1 | 12/2014 | Ito et al. | |
| 2014/0370214 A1 | 12/2014 | Araki et al. | |
| 2014/0370250 A1 | 12/2014 | Fujii et al. | |
| 2014/0375715 A1 | 12/2014 | Kitada et al. | |
| 2015/0064398 A1 | 3/2015 | Umebayashi | |
| 2015/0077481 A1 | 3/2015 | Yoshino et al. | |
| 2015/0116425 A1 | 4/2015 | De Meutter et al. | |
| 2015/0130878 A1* | 5/2015 | Kohzuki | C09D 175/08 347/85 |
| 2015/0240094 A1 | 8/2015 | Kagose et al. | |
| 2015/0291818 A1 | 10/2015 | Kida et al. | |
| 2015/0315396 A1 | 11/2015 | Kida et al. | |
| 2015/0344709 A1 | 12/2015 | Araki | |
| 2015/0344722 A1* | 12/2015 | Lin | C09D 5/004 428/483 |
| 2015/0375459 A1 | 12/2015 | Sato et al. | |
| 2016/0001578 A1 | 1/2016 | Kobayashi et al. | |
| 2016/0083604 A1 | 3/2016 | Steert et al. | |
| 2016/0102216 A1 | 4/2016 | Hirade et al. | |
| 2016/0160062 A1 | 6/2016 | Kida et al. | |
| 2016/0222146 A1* | 8/2016 | Yamashita | C09D 4/06 |
| 2016/0312052 A1 | 10/2016 | Cong et al. | |
| 2017/0058135 A1 | 3/2017 | Kohzuki et al. | |
| 2017/0233594 A1 | 8/2017 | Yoda et al. | |
| 2017/0240659 A1* | 8/2017 | Norcini | C09D 11/107 |
| 2017/0240754 A1 | 8/2017 | Tsuchiya et al. | |
| 2017/0252971 A1 | 9/2017 | Umebayashi | |
| 2017/0283631 A1 | 10/2017 | Paul et al. | |
| 2018/0002552 A1 | 1/2018 | Nakano et al. | |
| 2018/0022946 A1 | 1/2018 | Kida et al. | |
| 2018/0030290 A1 | 2/2018 | Hirose et al. | |
| 2018/0079921 A1* | 3/2018 | Okamoto | C09D 11/328 |
| 2018/0136559 A1* | 5/2018 | Sakai | G03F 7/033 |
| 2018/0154658 A1 | 6/2018 | Kobayashi et al. | |
| 2018/0223117 A1 | 8/2018 | Toeda et al. | |
| 2018/0244933 A1 | 8/2018 | Tsuchiya et al. | |
| 2018/0273778 A1 | 9/2018 | Saito et al. | |
| 2018/0362279 A1 | 12/2018 | Yoshida et al. | |
| 2019/0008519 A1 | 1/2019 | Nativ et al. | |
| 2019/0085190 A1* | 3/2019 | De Meutter | C09D 11/40 |
| 2019/0092957 A1 | 3/2019 | Nakano et al. | |
| 2020/0224044 A1 | 7/2020 | Kida et al. | |

(56) References Cited

U.S. PATENT DOCUMENTS

| | | |
|---|---|---|
| 2020/0231725 A1 | 7/2020 | Matsushita et al. |
| 2020/0231830 A1 | 7/2020 | Kobayashi et al. |
| 2020/0231832 A1 | 7/2020 | Shimizu et al. |
| 2020/0247146 A1 | 8/2020 | Kobayashi et al. |
| 2020/0254784 A1 | 8/2020 | Sato et al. |
| 2020/0255677 A1 | 8/2020 | Tanaka et al. |
| 2020/0255678 A1 | 8/2020 | Sekine et al. |
| 2020/0255679 A1 | 8/2020 | Sekine et al. |
| 2020/0255682 A1 | 8/2020 | Tanaka et al. |
| 2020/0270286 A1 | 8/2020 | Miyamoto et al. |
| 2020/0392353 A1 | 12/2020 | Tanaka et al. |
| 2020/0392357 A1 | 12/2020 | Sekine et al. |
| 2021/0071024 A1 | 3/2021 | Tanaka et al. |
| 2021/0079242 A1 | 3/2021 | Yoda et al. |
| 2021/0301159 A1 | 9/2021 | Kida et al. |
| 2022/0041879 A1 | 2/2022 | Nakashima et al. |

FOREIGN PATENT DOCUMENTS

| | | |
|---|---|---|
| CN | 101831214 A | 9/2010 |
| CN | 102558958 A | 7/2012 |
| CN | 102585599 A | 7/2012 |
| CN | 107602776 A | 1/2018 |
| CN | 108624139 A | 10/2018 |
| CN | 108884342 A | 11/2018 |
| CN | 109554018 A | 4/2019 |
| EP | 1911814 A1 | 4/2008 |
| EP | 2471879 A1 | 7/2012 |
| EP | 2502967 A2 | 9/2012 |
| EP | 2 644 664 A1 | 10/2013 |
| EP | 2 653 511 A1 | 10/2013 |
| EP | 2 848 660 A1 | 3/2015 |
| EP | 2842763 A2 | 3/2015 |
| EP | 3222684 A1 | 9/2017 |
| EP | 3243666 A1 | 11/2017 |
| JP | 2006-299117 A | 11/2006 |
| JP | 2006-312711 A | 11/2006 |
| JP | 2007-321034 A | 12/2007 |
| JP | 2008-045145 A | 2/2008 |
| JP | 2008-163080 A | 7/2008 |
| JP | 2008-189887 A | 8/2008 |
| JP | 2008-208190 A | 9/2008 |
| JP | 2008-214395 A | 9/2008 |
| JP | 2008-254196 A | 10/2008 |
| JP | 2009-185186 A | 8/2009 |
| JP | 2009-203287 A | 9/2009 |
| JP | 2010-184996 A | 8/2010 |
| JP | 2010-235914 A | 10/2010 |
| JP | 2011-095602 A | 5/2011 |
| JP | 2011-168735 A | 9/2011 |
| JP | 2011-225824 A | 11/2011 |
| JP | 2012-077159 A | 4/2012 |
| JP | 2012-116928 A | 6/2012 |
| JP | 2012-126885 A | 7/2012 |
| JP | 2012-140550 A | 7/2012 |
| JP | 2012-153853 A | 8/2012 |
| JP | 2012-158672 A | 8/2012 |
| JP | 2012-162688 A | 8/2012 |
| JP | 2012-201815 A | 10/2012 |
| JP | 2013-503931 A | 2/2013 |
| JP | 2013-079383 A | 5/2013 |
| JP | 2013-142104 A | 7/2013 |
| JP | 2013-163740 A | 8/2013 |
| JP | 2013-227515 A | 11/2013 |
| JP | 2013-240978 A | 12/2013 |
| JP | 2013-240980 A | 12/2013 |
| JP | 2014-070135 A | 4/2014 |
| JP | 2014-196414 A | 10/2014 |
| JP | 2014-198748 A | 10/2014 |
| JP | 2014-240153 A | 12/2014 |
| JP | 2014-240177 A | 12/2014 |
| JP | 2015-014009 A | 1/2015 |
| JP | 2015-048387 A | 3/2015 |
| JP | 2015-081284 A | 4/2015 |
| JP | 2015-091662 A | 5/2015 |
| JP | 2015-178609 A | 10/2015 |
| JP | 2015-203051 A | 11/2015 |
| JP | 2015-533897 A | 11/2015 |
| JP | 2015-224340 A | 12/2015 |
| JP | 2016-041820 A | 3/2016 |
| JP | 2016-130315 A | 7/2016 |
| JP | 2016-153498 A | 8/2016 |
| JP | 2016-160274 A | 9/2016 |
| JP | 2017-002187 A | 1/2017 |
| JP | 2017-039809 A | 2/2017 |
| JP | 2017-141382 A | 8/2017 |
| JP | 2017-149825 A | 8/2017 |
| JP | 2017-155181 A | 9/2017 |
| JP | 2017-155190 A | 9/2017 |
| JP | 2017-206005 A | 11/2017 |
| JP | 2018-009142 A | 1/2018 |
| JP | 2018-127527 A | 8/2018 |
| JP | 2018-141101 A | 9/2018 |
| JP | 2018-162375 A | 10/2018 |
| JP | 2019-031618 A | 2/2019 |
| JP | 2019-508534 A | 3/2019 |
| JP | 2019-056114 A | 4/2019 |
| JP | 2019-059807 A | 4/2019 |
| JP | 2019081867 A | 5/2019 |
| JP | 2019-094405 A | 6/2019 |
| JP | 2019-151703 A | 9/2019 |
| JP | 2019151714 A | 9/2019 |
| JP | 2020-519561 A | 7/2020 |
| JP | 2020-117585 A | 8/2020 |
| JP | 2020-117587 A | 8/2020 |
| JP | 2020-117603 A | 8/2020 |
| WO | WO-2014-051702 A1 | 4/2014 |
| WO | WO-2015-140538 A1 | 9/2015 |
| WO | WO-2016-098636 A1 | 6/2016 |
| WO | 2016-136097 A1 | 9/2016 |

OTHER PUBLICATIONS

Miller Sturt Kenyon Intellectual Property; RE: European Patent Application No. 21164254.1; Seiko Epson Corporation; Jan. 26, 2022; (5 pp).

Nagase Specialty Materials NA LLC—VEEA—Specialty Hybrid Acrylate Monomer—Technical Data Sheet; inquiry@nsm-na.com; cited on Jun. 25, 2024 in EP 21164254.1; (1 pg).

Allnex—The Coating Resins Company—TMPTA Technical Datasheet; version 2.0; Worldwide Contact Info: www.allnex.com; cited on Jun. 25, 2024 in EP 21164254.1; (1 pg).

Allnex—The Coating Resins Company—TPGDA Technical Datasheet; version 3.0/ Feb. 6, 2021 (replaces all previous versions); Worldwide Contact Info: www.allnex.com; cited on Jun. 25, 2024 in EP 21164254.1 (1 pg).

Venkatram et al. "Critical Assessment of the Hildebrand and Hansen Solubility Parameters for Polymer" J. Chem Inf. Model, 2019, 59, 10, pp. 4188-4194, published Sep. 23, 2019.

G. Jing et al., "Series on 500 Questions About Practical Printing and Packaging Technology", 200 Questions About UV Glazing Process and Technology, Graphic Communications Press, Mar. 5, 2023, with English translation (7 Pages).

\* cited by examiner

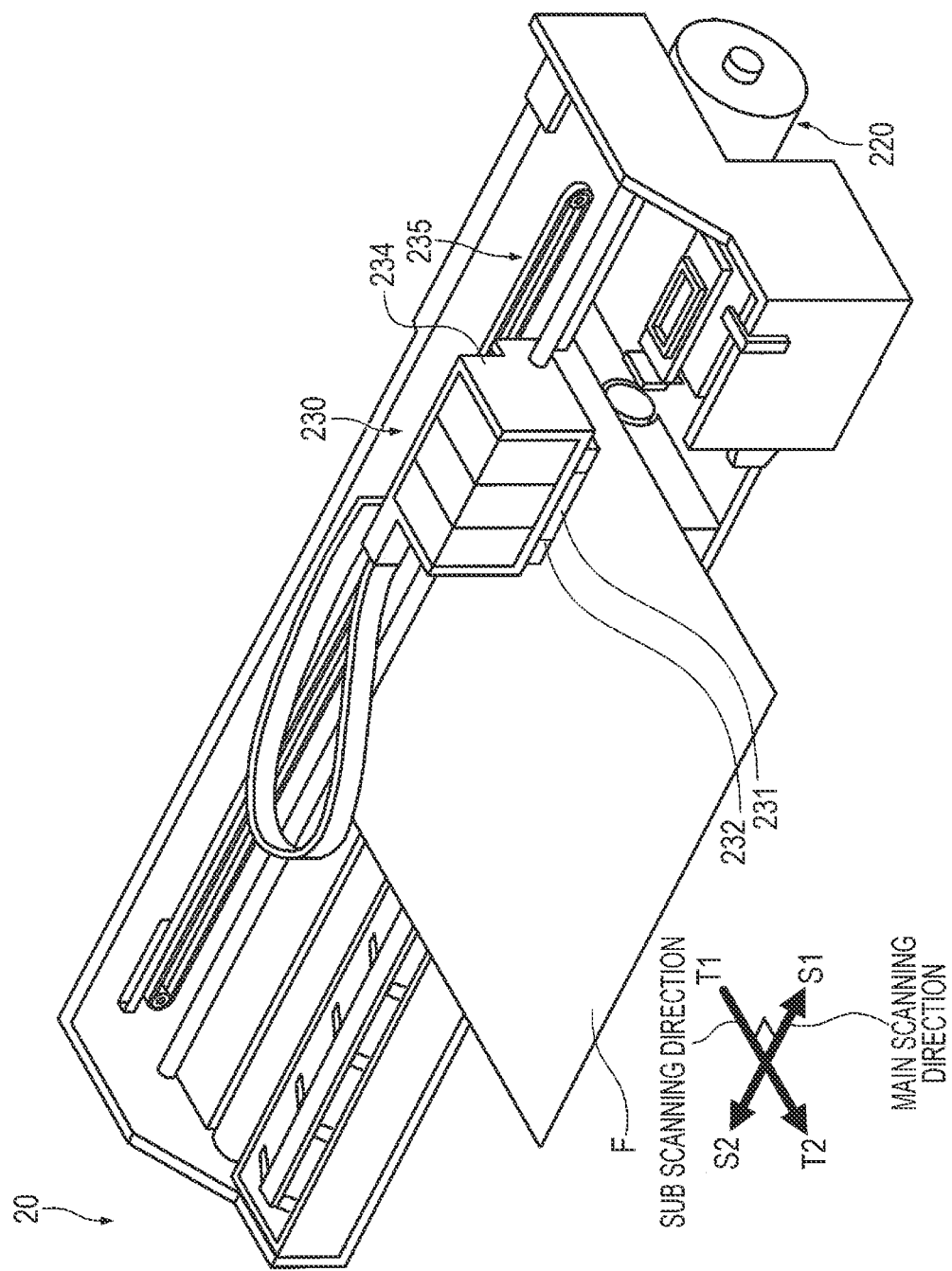

RADIATION CURABLE INK JET COMPOSITION AND INK JET METHOD

This application is a continuation of U.S. patent application Ser. No. 17/210,611 filed Mar. 24, 2021, and claims priority from JP Application Serial Number 2020-053853, filed Mar. 25, 2020, the disclosures of which are hereby expressly incorporated by reference herein in their entireties.

BACKGROUND

1. Technical Field

The present disclosure relates to a radiation curable ink jet composition and an ink jet method.

2. Related Art

An ink jet recording method is able to record a highly fine image by a relatively simple apparatus and has been rapidly developed in various fields. In particular, various investigations have been carried out on, for example, a curing property of a coating film of an ink jet composition which is cured by radiation emission. In order to provide an ultraviolet curable ink jet ink composition having an excellent curing property which can be used for both a thin cured film and a thick cured film, for example, JP-A-2012-126885 has disclosed an ultraviolet curable ink jet composition containing a vinyl ether group-containing (meth)acrylate, a monofunctional (meth)acrylate having an aromatic ring skeleton, and a photopolymerization initiator.

Incidentally, as a photopolymerization initiator to be used for a radiation curable ink jet composition, an acylphosphine oxide-based photopolymerization initiator may be mentioned. However, since being a solid at ordinary temperature, the acylphosphine oxide-based photopolymerization initiator cannot be said to have a high solubility, and in order to dissolve the acylphosphine oxide-based photopolymerization initiator as described above, an aromatic-based monomer, such as phenoxyethyl acrylate, is used.

However, in order to secure the solubility of the photopolymerization initiator, when an aromatic-based monomer, such as phenoxyethyl acrylate, is frequently used, the range of selection of other polymerizable monomers is narrowed, and as a result, a problem in that the ink composition is restricted may arise in some cases. Accordingly, in sign application and the like in which when post processing, such as cutting and/or bending, is performed, for example, cracking and/or chipping may occur in an ink coating film, there has been a problem in that a monomer composition necessary to form an ink coating film having desired physical properties which overcome the above disadvantages is difficult to realize.

SUMMARY

According to an aspect of the present disclosure, there is provided a radiation curable ink jet composition comprising: polymerizable compounds; and a photopolymerization initiator. In the radiation curable ink jet composition described above, the polymerizable compounds include a monofunctional monomer, a content of the monofunctional monomer with respect to a total mass of the polymerizable compounds is 90 percent by mass or more, and the photopolymerization initiator includes ethyl (2,4,6-trimethylbenzoyl)phenylphosphinate.

According to another aspect of the present disclosure, there is provided an ink jet method comprising: an ejection step of ejecting a radiation curable ink jet composition by a liquid ejection head so as to be adhered to a recording medium; and an emission step of emitting radiation rays to the radiation curable ink jet composition adhered to the recording medium.

BRIEF DESCRIPTION OF THE DRAWINGS

FIGURE is a perspective view showing a serial type ink jet apparatus according to this embodiment.

DESCRIPTION OF EXEMPLARY EMBODIMENTS

Hereinafter, if needed, with reference to the drawing, although an embodiment (hereinafter, referred to as "this embodiment") of the present disclosure will be described in detail, the present disclosure is not limited thereto and may be variously changed and/or modified without departing from the scope of the present disclosure. In addition, in the drawing, elements similar or equivalent to each other are designated by the same reference numeral, and duplicated description will be omitted. In addition, the positional relationship, such as top to bottom and/or right to left, is based on the positional relationship shown in the drawing, unless otherwise particularly noted. Furthermore, a dimensional ratio in the drawing is not limited to the ratio shown therein.

1. RADIATION CURABLE INK JET COMPOSITION

A radiation curable ink jet composition (hereinafter, also simply referred to as "composition" in some cases) according to this embodiment is a radiation curable ink jet composition including polymerizable compounds and a photopolymerization initiator, the polymerizable compounds include at least one monofunctional monomer, a content of the monofunctional monomer with respect to a total mass of the polymerizable compounds is 90 percent by mass or more, and the photopolymerization initiator includes ethyl (2,4,6-trimethylbenzoyl)phenylphosphinate (hereinafter, referred to as "TPO-L" in some cases).

In addition, the radiation curable ink jet composition according to this embodiment may also include, if needed, a photopolymerization initiator different from that described above, a polymerization inhibitor, a colorant, a surfactant, and/or the like.

In the radiation curable ink jet composition, in view of the solubility of the photopolymerization initiator, an aromatic-based monomer, such as phenoxyethyl acrylate, has been used together therewith. However, when a use amount of the aromatic-based monomer is relatively increased in view of the solubility of the photopolymerization initiator, a use amount of the other monomers is required to be relatively decreased, and as a result, a problem in that a monomer composition necessary to form an ink coating film having desired physical properties is difficult to realize may occur in some cases.

In addition, when a use amount of the photopolymerization initiator is increased so as to enhance a curing property of the composition, in association with the increase described above, the use amount of the aromatic-based monomer is required to be increased. However, since the aromatic-based monomer has a relatively high viscosity, when the use amount thereof is simply increased, the viscosity of the composition is unfavorably increased, and as a result, a problem in terms of ink jet aptitude may arise in some cases.

On the other hand, in this embodiment, ethyl (2,4,6-trimethylbenzoyl)phenylphosphinate which is a liquid polymerization initiator at ordinary temperature is used. Accordingly, the restriction in which a solid photopolymerization initiator at ordinary temperature is dissolved by an aromatic-based monomer can be removed, and hence, the degree of freedom in monomer design can be secured. Hence, physical properties, such as adhesion, of an ink coating film to be obtained can be further improved. Furthermore, the problem of the increase in viscosity caused by the use of the aromatic-based monomer can also be solved.

In addition, the radiation curable ink jet composition of this embodiment is a composition which is used by ejection from an ink jet head by an ink jet method. Hereinafter, as one embodiment of the radiation curable ink jet composition, although a radiation curable ink composition will be described, the composition according to this embodiment may also be, besides the ink composition, a composition to be used for 3D formation and the like.

In addition, the "radiation curable ink jet composition" according to this embodiment is cured by emission of radiation rays. As the radiation rays, for example, there may be mentioned ultraviolet rays, electron rays, infrared rays, visible light rays, x-rays, or active energy rays. As the radiation rays, since an UV radiation source is easily available and is widely used, and a material to be suitably cured by emission of ultraviolet rays is easily available and is widely used, ultraviolet rays are preferable.

Hereinafter, components to be contained in the radiation curable ink jet composition according to this embodiment and a manufacturing method thereof will be described.

1.1. POLYMERIZABLE COMPOUND

In this embodiment, compounds to be cured by radiation emission are collectively called polymerizable compounds. As the polymerizable compound, a monofunctional monomer having one polymerizable functional group, a polyfunctional monomer having at least two polymerizable functional groups, or an oligomer having at least one polymerizable functional group may be mentioned. The polymerizable compound may be used alone, or at least two types thereof may be used in combination.

In this embodiment, when content mass ratios of the polymerizable compounds are regarded as their respective weights, a weighted average of glass transition temperatures of homopolymers derived from the respective polymerizable compounds is preferably 38° C. or more, more preferably 45° C. or more, further preferably 48° C. or more, and even further preferably 50° C. or more. Since the weighted average of the glass transition temperatures is 38° C. or more, an abrasion resistance of the coating film at room temperature tends to be further improved. In addition, although being not particularly limited, an upper limit of the weighted average of the glass transition temperatures is preferably 60° C. or less, more preferably 55° C. or less, and further preferably 50° C. or less.

A calculation method of the weighted average of the glass transition temperatures will be described. The weighted average of the glass transition temperatures, a glass transition temperature of a homopolymer derived from an N-th polymerizable compound, and a content mass ratio of the N-th polymerizable compound are represented by $Tg_{A11}$, $Tg_N$, and $X_N$ (percent by mass), respectively. In accordance with the types of polymerizable compounds contained in the radiation curable ink jet composition, N is sequentially represented by from an integer of 1. For example, when three types of polymerizable compounds are used, $Tg_1$, $Tg_2$, and $Tg_3$ are obtained. In addition, a glass transition temperature of a homopolymer derived from one polymerizable compound can be obtained from a safety data sheet (SDS) and/or catalog information of the above one polymerizable compound. The weighted average of the glass transition temperatures is the sum of a product of the content mass ratio $X_N$ of the N-th polymerizable compound and the glass transition temperature $Tg_N$ calculated from the N-th polymerizable compound. Hence, the following equation (2) is satisfied.

$$Tg_{A11} = \Sigma Tg_N \times X_N \qquad (2)$$

In this embodiment, when the content mass ratios of the polymerizable compounds are regarded as their respective weights, a weighted average of SP values of the polymerizable compounds is preferably 8.5 to 10.8, more preferably 9.0 to 10.5, and further preferably 9.1 to 10.0. Since the weighted average of the SP values is in the range described above, the adhesion to various recording media formed from, for example, a polyolefin, such as a polypropylene, or a polyester, such as a poly(ethylene terephthalate), tends to be further improved.

A calculation method of the weighted average of the SP values will be described. The weighted average of the SP values, a SP value of an N-th polymerizable compound, and a content mass ratio of the N-th polymerizable compound are represented by $SP_{A11}$, $SP_N$, and $X_N$ (percent by mass), respectively. In accordance with the types of polymerizable compounds contained in the radiation curable ink jet composition, N is sequentially represented by from an integer of 1. For example, when three types of polymerizable compounds are used, $SP_1$, $SP_2$, and $SP_3$ are obtained. In addition, an SP value of one polymerizable compound can be obtained from a safety data sheet (SDS) or catalog information of the above one polymerizable compound. The weighted average of the SP values is the sum of a product of the content mass ratio $X_N$ of the N-th polymerizable compound and the $SP_N$ calculated from the N-th polymerizable compound. Hence, the following equation (3) is satisfied.

$$SP_{A11} = \Sigma SP_N \times X_N \qquad (3)$$

In addition, the weighted average of the glass transition temperatures and the weighted average of the SP values can be adjusted by the glass transition temperature and the SP value of each polymerizable compound to be used, respectively, and by the content mass ratio of each polymerizable compound to be used.

1.1.1. MONOFUNCTIONAL MONOMER

The monofunctional monomer according to this embodiment is not particularly limited, and for example, there may be mentioned an aromatic group-containing monofunctional monomer, a nitrogen-containing monofunctional monomer, an alicyclic group-containing monofunctional monomer, an urethane acrylate, an aliphatic group-containing monofunctional monomer, or a hydroxy group-containing monofunctional monomer. In addition, if needed, at least one monofunctional monomer different from those mentioned above may also be contained. In addition, the different monofunctional monomer described above is not particularly limited, and for example, a known monofunctional monomer having a polymerizable functional group, in particular, a polymerizable functional group which has an unsaturated double bond between carbons, may be used.

The content of the monofunctional monomer with respect to the total mass of the polymerizable compounds is 90 percent by mass or more, preferably 91 percent by mass or more, and more preferably 92 percent by mass or more. Since the content of the monofunctional monomer with respect to the total mass of the polymerizable compounds is 90 percent by mass or more, flexibility and adhesion of the coating film are further improved. In addition, although being not particularly limited, an upper limit of the content of the monofunctional monomer with respect to the total mass of the polymerizable compounds is preferably 99 percent by mass or less, more preferably 98 percent by mass or less, and further preferably 97 percent by mass or less. Since the content of the monofunctional monomer with respect to the total mass of the polymerizable compounds is 99 percent by mass or less, the abrasion resistance of the coating film tends to be further improved.

In addition, the content of the monofunctional monomer with respect to the total mass of the composition is preferably 70 percent by mass or more, more preferably 72 percent by mass or more, and further preferably 74 percent by mass or more. Since the content of the monofunctional monomer with respect to the total mass of the composition is 70 percent by mass or more, the flexibility and the adhesion of the coating film tend to be further improved. In addition, an upper limit of the content of the monofunctional monomer with respect to the total mass of the composition is preferably 86 percent by mass or less, more preferably 84 percent by mass or less, and further preferably 82 percent by mass or less. Since the content of the monofunctional monomer with respect to the total mass of the composition is 86 percent by mass or less, the abrasion resistance of the coating film tends to be further improved.

Hereinafter, although examples of the monofunctional monomer will be shown, the monofunctional monomer according to this embodiment is not limited to the following monomers.

1.1.1.1. AROMATIC GROUP-CONTAINING MONOFUNCTIONAL MONOMER

The aromatic group-containing monofunctional monomer is not particularly limited as long as having an aromatic group, and for example, there may be mentioned phenoxyethyl (meth)acrylate, benzyl (meth)acrylate, alkoxylated 2-phenoxyethyl (meth)acrylate, ethoxylated nonylphenyl (meth)acrylate, alkoxylated nonylphenyl (meth)acrylate, p-cumylphenol EO-modified (meth)acrylate, or 2-hydroxy-3-phneoxypropyl (meth)acrylate.

Among those mentioned above, phenoxyethyl (meth)acrylate and benzyl (meth)acrylate are preferable, phenoxyethyl (meth)acrylate is more preferable, and phenoxyethyl acrylate (PEA) is further preferable. Since the aromatic group-containing monomer as described above is used, when a photopolymerization initiator which is a solid at ordinary temperature is used together with TPO-L, the solubility thereof is further improved, and the curing property of the composition tends to be further improved. In particular, when an acylphosphine oxide-based polymerization initiator or a thioxanthone-based polymerization initiator, each of which is a solid at ordinary temperature, is used, the solubility thereof tends to be improved. In addition, since phenoxyethyl (meth)acrylate is used, the odor tends to be further reduced.

The content of the aromatic group-containing monofunctional monomer with respect to the total mass the polymerizable compounds is preferably 35 percent by mass or less, more preferably 30 percent by mass or less, further preferably 28 percent by mass or less, and even further preferably 25 percent by mass or less. In addition, the content of the aromatic group-containing monofunctional monomer with respect to the total mass of the polymerizable compounds is preferably 5 percent by mass or more, more preferably 10 percent by mass or more, further preferably 15 percent by mass or more, and even further preferably 20 percent by mass or more. Since the composition of this embodiment uses TPO-L, a use amount of the aromatic group-containing monofunctional monomer can be decreased, and hence, the degree of freedom in design of the monomer composition can be further improved, and the viscosity of the composition can also be decreased. Since the content of the aromatic group-containing monofunctional monomer with respect to the total mass of the polymerizable compounds is 35 percent by mass or less, the viscosity of the composition is further decreased, and the adhesion and the abrasion resistance of the coating film tends to be further improved.

The content of the aromatic group-containing monofunctional monomer with respect to the total mass of the composition is preferably 15 to 40 percent by mass, more preferably 20 to 40 percent by mass, and further preferably 25 to 35 percent by mass. Since the content of the aromatic group-containing monofunctional monomer with respect to the total mass of the composition is in the range described above, the viscosity of the composition is further decreased, and the abrasion resistance of the coating film tends to be further improved.

1.1.1.2. NITROGEN-CONTAINING MONOFUNCTIONAL MONOMER

The nitrogen-containing monofunctional monomer is not particularly limited, and for example, there may be mentioned a nitrogen-containing monofunctional vinyl monomer, such as N-vinylcaprolactam, N-vinylformamide, N-vinylcarbazole, N-vinylacetamide, or N-vinylpyrrolidone; a nitrogen-containing monofunctional acrylate monomer, such as acryloylmorpholine or dimethylaminoethyl acrylate benzyl chloride quaternary salt; a nitrogen-containing monofunctional acrylamide monomer, such as (meth)acrylamide, N-hydroxymethyl (meth)acrylamide, diacetone (meth)acrylamide, or N,N-dimethyl (meth)acrylamide.

Among those mentioned above, the nitrogen-containing monofunctional vinyl monomer or the nitrogen-containing monofunctional acrylate monomer is preferably contained, a monomer, such as N-vinylcaprolactam, N-vinylcarbazole, N-vinylpyrrolidone, or acryloylmorpholine, having a nitrogen-containing heterocyclic structure is more preferably contained, and acryloylmorpholine is further preferably contained. When the nitrogen-containing monofunctional monomer as described above is used, the abrasion resistance of the coating film tends to be further improved.

The content of the nitrogen-containing monofunctional monomer with respect to the total mass of the polymerizable compounds is preferably 5.0 to 30 percent by mass, more preferably 10 to 26 percent by mass, and further preferably 13 to 20 percent by mass. Since the content of the nitrogen-containing monofunctional monomer with respect to the total mass of the polymerizable compounds is 5 percent by mass or more, the abrasion resistance of the coating film tends to be further improved. In addition, since the content of the nitrogen-containing monofunctional monomer with respect to the total mass of the polymerizable compounds is 30 percent by mass or less, the adhesion of the coating film tends to be further improved.

The content of the nitrogen-containing monofunctional monomer with respect to the total mass of the composition is preferably 0.01 percent by mass or more, more preferably 5.0 percent by mass or more, further preferably 7.0 percent by mass or more, and even further preferably 10 percent by mass or more. In addition, the content of the nitrogen-containing monofunctional monomer with respect to the total mass of the composition is preferably 25 percent by mass or less, more preferably 20 percent by mass or less, and further preferably 15 percent by mass or less. Since the content of the nitrogen-containing monofunctional monomer with respect to the total mass of the composition is 0.01 percent by mass or more, a storage stability of the composition is further improved, and the abrasion resistance of the coating film tends to be further improved. In addition, since the content of the nitrogen-containing monofunctional monomer with respect to the total mass of the composition is 25 percent by mass or less, the adhesion of the coating film tends to be further improved.

1.1.1.3. ALICYCLIC GROUP-CONTAINING MONOFUNCTIONAL MONOMER

The alicyclic group-containing monofunctional monomer is not particularly limited as long as having at least one saturated or unsaturated non-aromatic carbon ring, and for example, there may be mentioned a monomer, such as tert-butylcyclohexanol acrylate (TBCHA), or 2-(meth)acrylic acid-(1,4-dioxaspiro[4,5]decane-2-yl)methyl, having a monocyclic hydrocarbon group; a monomer, such as dicyclopentenyl acrylate or dicyclopentenyloxyethyl acrylate, having an unsaturated polycyclic hydrocarbon group; or a monomer, such as dicyclopentanyl acrylate or isobornyl acrylate, having a saturated polycyclic hydrocarbon group. When the alicyclic group-containing monofunctional monomer as described above is used, the curing property of the composition tends to be further improved.

The content of the alicyclic group-containing monofunctional monomer with respect to the total mass of the polymerizable compounds is preferably 15 to 50 percent by mass, more preferably 20 to 45 percent by mass, and further preferably 25 to 40 percent by mass. Since the content of the alicyclic group-containing monofunctional monomer with respect to the total mass of the polymerizable compounds is in the range described above, the abrasion resistance of the coating film tends to be further improved.

The content of the alicyclic group-containing monofunctional monomer with respect to the total mass of the composition is preferably 15 to 45 percent by mass, more preferably 20 to 40 percent by mass, and further preferably 25 to 35 percent by mass. Since the content of the alicyclic group-containing monofunctional monomer with respect to the total mass of the composition is in the range described above, the abrasion resistance of the coating film tends to be further improved.

1.1.1.4. URETHANE ACRYLATE

The urethane acrylate is not particularly limited as long as being a (meth)acrylic acid ester having an urethane bond, and for example, there may be mentioned (methylcarbamoyloxy)ethyl (meth)acrylate, (ethylcarbamoyloxy)ethyl (meth)acrylate, (propylcarbamoyloxy)ethyl (meth)acrylate, (butylcarbamoyloxy)ethyl (meth)acrylate, (methylcarbamoyloxy)ethoxyethyl (meth)acrylate, (ethylcarbamoyloxy)ethoxyethyl (meth)acrylate, (propylcarbamoyloxy)ethoxyethyl (meth)acrylate, or (butylcarbamoyloxy)ethoxyethyl (meth)acrylate. Since the urethane acrylate as described above is used, the viscosity of the composition is further decreased, and the abrasion resistance of the coating film to be obtained tends to be further improved.

The content of the urethane acrylate with respect to the total mass of the polymerizable compounds is 0.5 to 10 percent by mass, preferably 1.0 to 7.0 percent by mass, and more preferably 2.0 to 5.0 percent by mass. Since the content of the urethane acrylate with respect to the total mass of the polymerizable compounds is in the range described above, the viscosity of the composition is further decreased, and the abrasion resistance of the coating film to be obtained tends to be further improved.

The content of the urethane acrylate with respect to the total mass of the composition is 0.5 to 7.5 percent by mass, preferably 1.0 to 5.0 percent by mass, and more preferably 2.0 to 4.0 percent by mass. Since the content of the urethane acrylate with respect to the total mass of the composition is in the range described above, the viscosity of the composition is further decreased, and the abrasion resistance of the coating film to be obtained tends to be further improved.

1.1.1.5. ALIPHATIC GROUP-CONTAINING MONOFUNCTIONAL MONOMER

The aliphatic group-containing monofunctional monomer is not particularly limited, and for example, a monomer represented by the following general formula (1) may be mentioned.

$$H_2C=CR^1-CO-O-R^2 \tag{1}$$

In the formula (1), $R^1$ represents a hydrogen atom or a methyl group, and $R^2$ represents a linear or branched aliphatic group having 4 to 20 carbon atoms.

The aliphatic group-containing monofunctional monomer as described above is not particularly limited as long as being a saturated or unsaturated linear or branched monomer having no carbon ring, and for example, there may be mentioned isoamyl (meth)acrylate, stearyl (meth)acrylate, lauryl (meth)acrylate, octyl (meth)acrylate, decyl (meth)acrylate, isodecyl (meth)acrylate, isononyl (meth)acrylate, isomyristyl (meth)acrylate, isostearyl (meth)acrylate, 2-hydroxybutyl (meth)acrylate, butoxyethyl (meth)acrylate, tetrahydrofurfuryl (meth)acrylate, 2-hydroxyethyl (meth)acrylate, or 2-hydroxypropyl (meth)acrylate. Among those mentioned above, an aliphatic group-containing monofunctional monomer having a saturated linear or branched chain is preferable, and lauryl (meth)acrylate and isononyl (meth)acrylate are more preferable. Since the aliphatic group-containing monofunctional monomer as described above is used, the viscosity of the composition is further decreased, and the adhesion of the coating film also tends to be further improved. In addition, since the aliphatic group-containing monofunctional monomer is used, the weighted average of the SP values tends to be increased.

The content of the aliphatic group-containing monofunctional monomer with respect to the total mass of the polymerizable compounds is preferably 1.0 to 18 percent by mass, more preferably 3.0 to 15 percent by mass, and further preferably 5.0 to 12 percent by mass. Since the content of the aliphatic group-containing monofunctional monomer with respect to the total mass of the polymerizable compounds is in the range described above, the viscosity of the composition is further decreased, and the adhesion of the coating film tends to be further improved.

The content of the aliphatic group-containing monofunctional monomer with respect to the total mass of the composition is preferably 1.0 to 17 percent by mass, more preferably 3.0 to 15 percent by mass, and further preferably 5.0 to 12 percent by mass. Since the content of the aliphatic group-containing monofunctional monomer with respect to the total mass of the composition is in the range described above, the viscosity of the composition is further decreased, and the adhesion of the coating film tends to be further improved.

1.1.1.6. HYDROXY GROUP-CONTAINING MONOFUNCTIONAL MONOMER

The hydroxy group-containing monofunctional monomer is not particularly limited, and for example, there may be mentioned 2-hydroxyethyl (meth)acrylate, 2-hydroxypropyl (meth)acrylate, 3-hydroxypropyl acrylate, 2-hydroxybutyl (meth)acrylate, 4-hydroxybutyl (meth)acrylate, ethylene glycol monovinyl ether, diethylene glycol monovinyl ether, or 2-(meth)acryloyloxy-2-hydroxypropyl phthalate. Since the hydroxy group-containing monofunctional monomer as described above is used, the viscosity of the composition is further decreased, and the adhesion of the coating film tends to be further improved. In addition, since the hydroxy group-containing monofunctional monomer is used, the weighted average of the SP values tends to be decreased.

The content of the hydroxy group-containing monofunctional monomer with respect to the total mass of the polymerizable compounds is preferably 1.0 to 35 percent by mass, more preferably 3.0 to 25 percent by mass, and further preferably 5.0 to 15 percent by mass. Since the content of the hydroxy group-containing monofunctional monomer with respect to the total mass of the polymerizable compounds is in the range described above, the viscosity of the composition is further decreased, and the adhesion of the coating film to be obtained tends to be further improved.

The content of the hydroxy group-containing monofunctional monomer with respect to the total mass of the composition is preferably 1.0 to 35 percent by mass, more preferably 3.0 to 25 percent by mass, and further preferably 5.0 to 15 percent by mass. Since the content of the hydroxy group-containing monofunctional monomer with respect to the total mass of the composition is in the range described above, the viscosity of the composition is further decreased, and the adhesion of the coating film to be obtained tends to be further improved.

1.1.1.7. OTHERS

As monofunctional monomers other than those mentioned above, for example, unsaturated carboxylic acids, such as (meth)acrylic acid, itaconic acid, crotonic acid, isocrotonic acid, and maleic acid; salts of the unsaturated carboxylic acids mentioned above; an ester, an urethane, an amide, and an anhydride of an unsaturated carboxylic acid; acrylonitrile, styrene, various unsaturated polyesters, unsaturated polyethers, and unsaturated polyamides may also be used.

1.1.2. POLYFUNCTIONAL MONOMER

The polyfunctional monomer is not particularly limited, and for example, a vinyl ether group-containing (meth) acrylate, a difunctional (meth)acrylate, or a polyfunctional (meth)acrylate having at least three functional groups may be mentioned. In addition, the polyfunctional monomer is not limited to those mentioned above.

The content of the polyfunctional monomer with respect to the total mass of the polymerizable compounds is preferably 1.0 to 10 percent by mass, more preferably 2.0 to 9.0 percent by mass, and further preferably 3.0 to 8.0 percent by mass. Since the content of the polyfunctional monomer with respect to the total mass of the polymerizable compounds is in the range described above, the curing property of the composition tends to be further improved.

The content of the polyfunctional monomer with respect to the total mass of the composition is preferably 0.5 to 12 percent by mass, more preferably 1.0 to 10 percent by mass, and further preferably 2.0 to 7.0 percent by mass. Since the content of the polyfunctional monomer with respect to the total mass of the composition is in the range described above, the curing property of the composition tends to be further improved.

Hereinafter, although polyfunctional monomers will be shown below by way of example, the polyfunctional monomers according to this embodiment are not limited thereto.

1.1.2.1. VINYL ETHER GROUP-CONTAINING (METH)ACRYLATE

The vinyl ether group-containing (meth)acrylate is not particularly limited, and for example, a compound represented by the following formula (2) may be mentioned. Since the vinyl ether group-containing (meth)acrylate as described above is contained, the viscosity of the composition is decreased, and an ejection stability of the composition tends to be further improved. In addition, the curing property of the composition is further improved, and the adhesion and the abrasion resistance of the coating film tend to be further improved.

$$CH_2=CR^1-COOR^2-O-CH=CH-R^3 \quad (2)$$

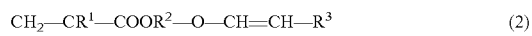

In the formula, $R^1$ represents a hydrogen atom or a methyl group, $R^2$ represents a divalent organic residue having 2 to 20 carbon atoms, and $R^3$ represents a hydrogen atom or a monovalent organic residue having 1 to 11 carbon atoms.

In the formula (2), as the divalent organic residue having 2 to 20 carbon atoms represented by $R^2$, for example, there may be mentioned a substituted or unsubstituted linear, branched, or cyclic alkylene group having 2 to 20 carbon atoms, a substituted or unsubstituted alkylene group having an oxygen atom derived from an ether bond and/or an ester bond in the structure and having 2 to 20 carbon atoms, or a substituted or unsubstituted divalent aromatic group having 6 to 11 carbon atoms. Among those mentioned above, for example, an alkylene group, such as an ethylene group, an n-propylene group, an isopropylene group, or a butylene group, having 2 to 6 carbon atoms or an alkylene group, such as an oxyethylene group, an oxy-n-propylene group, an oxyisopropylene group, or an oxybutylene group, having an oxygen atom derived from an ether bond in the structure and having 2 to 9 carbon atoms is preferable. In addition, in order to further decrease the viscosity of the composition and to further improve the curing property of the composition, a compound having a glycol ether chain is more preferable in which $R^2$ represents an alkylene group, such as an oxyethylene group, an oxy-n-propylene group, an oxyisopropylene group, or an oxybutylene group, having an oxygen atom derived from an ether bond in the structure and having 2 to 9 carbon atoms.

In the above formula (2), as the monovalent organic residue having 1 to 11 carbon atoms represented by $R^3$, a substituted or unsubstituted linear, branched, or cyclic alkyl group having 1 to 10 carbon atoms or a substituted or unsubstituted aromatic group having 6 to 11 carbon atoms is preferable. Among those mentioned above, an alkyl group, such as a methyl group or an ethyl group, having 1 to 2 carbon atoms or an aromatic group, such as a phenyl group or a benzyl group, having 6 to 8 carbon atoms is preferably used.

In the case in which the above organic residue may be a substituted residue, the substituent thereof can be classified into a group containing at least one carbon atom and a group containing no carbon atoms. First of all, when the substituent is a group containing at leat one carbon atom, the number of carbon atoms thereof is counted as the number of carbon atoms of the organic residue. Although the group containing at least one carbon atom is not limited to those mentioned below, for example, a carboxyl group or an alkoxy group may be mentioned. Next, although the group containing no carbon atoms is not limited to those mentioned below, for example, a hdyroxy group or a halo group may be mentioned.

A particular example of the compound represented by the formula (2) is not particularly limited, and for example, there may be mentioned (meth)acrylic acid 2-vinyloxyethyl, (meth)acrylic acid 3-vinyloxypropyl, (meth)acrylic acid 1-methyl-2-vinyloxyethyl, (meth)acrylic acid 2-vinyloxypropyl, (meth)acrylic acid 4-vinyloxybutyl, (meth)acrylic acid 1-methyl-3-vinyloxypropyl, (meth)acrylic acid 1-vinyloxymethylpropyl, (meth)acrylic acid 2-methyl-3-vinyloxypropyl, (meth)acrylic acid 1,1-dimethyl-2-vinyloxyethyl, (meth)acrylic acid 3-vinyloxybutyl, (meth)acrylic acid 1-methyl-2-vinyloxypropyl, (meth)acrylic acid 2-vinyloxybutyl, (meth)acrylic acid 4-vinyloxycyclohexyl, (meth)acrylic acid 6-vinyloxycyclohexyl, (meth)acrylic acid 4-vinyloxymethylcyclohexylmethyl, (meth)acrylic acid 3-vinyloxymethylcyclohexylmethyl, (meth)acrylic acid 2-vinyloxymethylcyclohexylmethyl, (meth)acrylic acid p-vinyloxymethylphenylmethyl, (meth)acrylic acid m-vinyloxymethylphenylmethyl, (meth)acrylic acid o-vinyloxymethylphenylmethyl, methacrylic acid 2-(2-vinyloxyethoxy)ethyl, acrylic acid 2-(2-vinyloxyethoxy)ethyl, (meth)acrylic acid 2-(vinyloxyisopropoxy)ethyl, (meth)acrylic acid 2-(vinyloxyethoxy)propyl, (meth)acrylic acid 2-(vinyloxyethoxy)isopropyl, (meth)acrylic acid 2-(vinyloxyisopropoxy)propyl, (meth)acrylic acid 2-(vinyloxyisopropoxy)isopropyl, (meth)acrylic acid 2-(vinyloxyethoxyethoxy)ethyl, (meth)acrylic acid 2-(vinyloxyethoxyisopropoxy)ethyl, (meth)acrylic acid 2-(vinyloxyisopropoxyethoxy)ethyl, (meth)acrylic acid 2-(vinyloxyisopropoxyisopropoxy)ethyl, (meth)acrylic acid 2-(vinyloxyethoxyethoxy)propyl, (meth)acrylic acid 2-(vinyloxyethoxyisopropoxy)propyl, (meth)acrylic acid 2-(vinyloxyisopropoxyethoxy)propyl, (meth)acrylic acid 2-(vinyloxyisopropoxyisopropoxy)propyl, (meth)acrylic acid 2-(vinyloxyethoxyethoxy)isopropyl, (meth)acrylic acid 2-(vinyloxyethoxyisopropoxy)isopropyl, (meth)acrylic acid 2-(vinyloxyisopropoxyethoxy)isopropyl, (meth)acrylic acid 2-(vinyloxyisopropoxyisopropoxy)isopropyl, (meth)acrylic acid 2-(vinyloxyethoxyethoxyethoxy) ethyl, (meth)acrylic acid 2-(vinyloxyethoxyethoxyethoxy)ethyl, (meth)acrylic acid 2-(isopropenoxyethoxy) ethyl, (meth)acrylic acid 2-(isopropenoxyethoxyethoxy) ethyl, (meth)acrylic acid 2-(isopropenoxyethoxyethoxyethoxy)ethyl, (meth)acrylic acid 2-(isopropenoxyethoxyethoxyethoxy)ethyl, (meth)acrylic acid polyethylene glycol monovinyl ether, or (meth)acrylic acid polypropylene glycol monovinyl ether. Among those particular examples, since the balance between the curing property and the viscosity of the composition is likely to be obtained, acrylic acid 2-(2-vinyloxyethoxy)ethyl is particularly preferable. In addition, in this embodiment, acrylic acid 2-(2-vinyloxyethoxy)ethyl is also called VEEA in some cases.

The content of the vinyl ether group-containing (meth)acrylate (meth)acrylate with respect to the total mass of the polymerizable compounds is preferably 1.0 to 10 percent by mass, more preferably 2.0 to 9.0 percent by mass, and further preferably 3.0 to 8.0 percent by mass. Since the content of the vinyl ether group-containing (meth)acrylate (meth)acrylate with respect to the total mass of the polymerizable compounds is in the range described above, the viscosity of the composition is decreased, and the curing property thereof tends to be further improved.

The content of the vinyl ether group-containing (meth) acrylate (meth)acrylate with respect to the total mass of the composition is preferably 0.5 to 12 percent by mass, more preferably 1.0 to 10 percent by mass, and further preferably 2.0 to 7.0 percent by mass. Since the content of the vinyl ether group-containing (meth)acrylate (meth)acrylate with respect to the total mass of the composition is in the range described above, the viscosity of the composition is decreased, and the curing property thereof tends to be further improved.

1.1.2.2. DIFUNCTIONAL (METH)ACRYLATE

The difunctional (meth)acrylate is not particularly limited, and for example, there may be mentioned dipropylene glycol diacrylate (DPGDA), diethylene glycol di(meth)acrylate, triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, polypropylene glycol di(meth)acrylate, 1,4-butanediol di(meth)acrylate, 1,6-hexanediol di(meth) acrylate, 1,9-nonanediol di(meth)acrylate, neopentyl glycol di(meth)acrylate, dimethylol-tricyclodecane di(meth)acrylate, bisphenol A EO (ethylene oxide) adduct di(meth) acrylate, bisphenol A PO (propylene oxide) adduct di(meth) acrylate, hydroxypivalic acid neopentyl glycol di(meth) acrylate, or polytetramethylene glycol di(meth)acrylate.

1.1.2.3. POLYFUNCTIONAL (METH)ACRYLATE HAVING AT LEAST THREE FUNCTIONAL GROUPS

The polyfunctional (meth)acrylate having at least three functional groups is not particularly limited, and for example, there may be mentioned trimethylolpropane tri (meth)acrylate, EO modified trimethylolpropane tri(meth) acrylate, pentaerythritol tri(meth)acrylate, pentaerythritol tetra(meth)acrylate, dipentaerythritol hexa(meth)acrylate, ditrimethylolpropane tetra(meth)acrylate, glycerinpropoxy tri(meth)acrylate, caprolactone-modified trimethylolpropane tri(meth)acrylate, pentaerythritolethoxy tetra(meth) acrylate, or caprolactam-modified dipentaerythritol hexa(meth)acrylate. 1.1.2.4. AROMATIC GROUP-CONTAINING POLYFUNCTIONAL MONOMER In the above polyfunctional monomers, the content of the aromatic group-containing polyfunctional monomer having an aromatic group with respect to the total mass of the polymerizable compounds is preferably 0.05 to 20 percent by mass, more preferably 0.05 to 10 percent by mass, and further preferably 0.05 to 5.0 percent by mass.

In addition, the total content of the aromatic group-containing polyfunctional monomer and the aromatic group-containing monofunctional monomer with respect to the total mass of the polymerizable compounds is preferably 10 to 45 percent by mass, more preferably 15 to 40 percent by mass, and further preferably 20 to 35 percent by mass.

The aromatic group-containing polyfunctional monomer as described above is not particularly limited, and for example, the aforementioned bisphenol A EO (ethylene oxide) adduct di(meth)acrylate or bisphenol A PO (propylene oxide) adduct di(meth)acrylate may be mentioned.

1.1.3. OLIGOMER

The oligomer is a multimer containing polymerizable compounds each functioning as a constituent component and is a compound having at least one polymerizable functional group. In addition, the polymerizable compound in this case is not limited to the monofunctional monomer and the polyfunctional monomer described above. In this embodiment, a compound having a molecular weight of 1,000 or more is defined as the oligomer, and a compound having a molecular weight of 1,000 or less is defined as the monomer.

The oligomer as described above is not particularly limited, and for example, an urethane acrylate oligomer having an urethane as a repeating structure, a polyester acrylate oligomer having an ester as a repeating structure, or an epoxy acrylate oligomer having an epoxy as a repeating structure may be mentioned.

Among those oligomers described above, the urethane acrylate oligomer is preferable, an aliphatic urethane acrylate oligomer or an aromatic urethane acrylate oligomer is more preferable, and the aliphatic urethane acrylate oligomer is further preferable. In addition, the urethane acrylate oligomer is preferably an urethane acrylate oligomer having four functions or less is preferable, and a difunctional urethane acrylate oligomer is more preferable. Since the oligomer as described above is used, the viscosity of the composition is further decreased, and the curing property of the composition and the adhesion of the coating film tend to be further improved.

The content of the oligomer with respect to the total mass of the composition is preferably 1 to 15 percent by mass, more preferably 1 to 10 percent by mass, and further preferably 2 to 7 percent by mass. Since the content of the oligomer with respect to the total mass of the radiation curable ink jet composition is in the range described above, the viscosity of the composition is further decreased, and the curing property of the composition and the adhesion of the coating film tend to be further improved.

1.2. PHOTOPOLYMERIZATION INITIATOR

As the photopolymerization initiator, ethyl (2,4,6-trimethylbenzoyl)phenylphosphinate is used, and if needed, at least one photopolymerization initiator different therefrom may also be used. Since ethyl (2,4,6-trimethylbenzoyl)phenylphosphinate in the form of liquid at ordinary temperature is used, a problem in terms of solubility of a solid photopolymerization initiator at ordinary temperature can be fundamentally solved. In addition, hereinafter, a simply called "acylphosphine oxide-based photopolymerization initiator" indicates an acylphosphine oxide-based photopolymerization initiator other than ethyl (2,4,6-trimethylbenzoyl)phenylphosphinate.

The content of ethyl (2,4,6-trimethylbenzoyl)phenylphosphinate with respect to the total mass of the composition is preferably 0.5 percent by mass or more, more preferably 1.0 percent by mass or more, even more preferably 2.0 percent by mass or more, further preferably 2.5 percent by mass or more, and even further preferably 3.0 percent by mass or more. Since the content of ethyl (2,4,6-trimethylbenzoyl)phenylphosphinate with respect to the total mass of the composition is 0.5 percent by mass or more, the curing property of the composition is further improved, and even in the case in which at least one photopolymerization initiator different therefrom is also used, since a use amount of the different photopolymerization initiator described above is relatively decreased, the solubility of the photopolymerization initiator tends to be further improved.

In addition, the content of ethyl (2,4,6-trimethylbenzoyl)phenylphosphinate with respect to the total mass of the composition is preferably 17.5 percent by mass or less, more preferably 15 percent by mass or less, even more preferably 12.5 percent by mass or less, and further preferably 10 percent by mass or less. Since the content of ethyl (2,4,6-trimethylbenzoyl)phenylphosphinate with respect to the total mass of the composition is 17.5 percent by mass or less, the viscosity of the composition tends to be further decreased.

Furthermore, the content of ethyl (2,4,6-trimethylbenzoyl)phenylphosphinate with respect to the total mass of the photopolymerization initiators is preferably 10 to 100 percent by mass, more preferably 20 to 80 percent by mass, and even more preferably 30 to 60 percent by mass. Since the content of ethyl (2,4,6-trimethylbenzoyl)phenylphosphinate with respect to the total mass of the photopolymerization initiators is in the range described above, the curing property of the composition is further improved, and even in the case in which at least one photopolymerization initiator different therefrom is also used, since the use amount of the different photopolymerization initiator described above is relatively decreased, the solubility of the photopolymerization initiator tends to be further improved. In addition, the viscosity of the composition also tends to be further decreased.

The different photopolymerization initiator described above is not particularly limited as long as being capable of generating active species by radiation emission, and for example, a known photopolymerization initiator, such as an acylphosphine oxide-based photopolymerization initiator, a thioxanthone-based photopolymerization initiator, an alkylphenone-based photopolymerization initiator, or a benzophenone-based photopolymerization initiator, may be mentioned. Among those mentioned above, the acylphosphine oxide-based photopolymerization initiator or the thioxanthone-based photopolymerization initiator is preferable, and the acylphosphine oxide-based photopolymerization initiator is more preferable. When the photopolymerization initiator as described above is used, the curing property of the composition is further improved, and in particular, the curing property thereof in a curing process performed by light emitted from an ultraviolet light-emitting diode (UV-LED) tends to be further improved. The photopolymerization initiator may be used alone, or at least two types thereof may be used in combination.

The content of the different photopolymerization initiator with respect to the total mass of the composition is preferably 1.0 to 10.0 percent by mass, more preferably 1.0 to 8.0 percent by mass, and further preferably 2.0 to 7.0 percent by mass. Since the content of the different photopolymerization initiator is in the range described above, the curing property of the composition and the solubility of the photopolymerization initiator tend to be further improved.

In addition, the total content of the photopolymerization initiators including ethyl (2,4,6-trimethylbenzoyl)phenylphosphinate and at least one photopolymerization initiator different therefrom is preferably 5.0 to 19 percent by mass, more preferably 6.0 to 17 percent by mass, and further preferably 7.0 to 15 percent by mass. Since the total content of the photopolymerization initiators is in the range described above, the curing property of the composition and the solubility of the photopolymerization initiator tend to be further improved.

The acylphosphine oxide-based photopolymerization initiator is not particularly limited, and for example, IRGACURE 819 (bis(2,4,6-trimethylbenzoyl)-phenylphosphine oxide) or SPEEDCURE TPO (2,4,6-trimethylbenzoyldiphenylphosphine oxide) may be mentioned. In addition, besides the above photopolymerization initiator, a sensitizer, such as SPEEDCURE DETX (2,4-diethylthioxanthene-9-one), may also be used.

The content of the acylphosphine oxide-based photopolymerization initiator with respect to the total mass of the composition is preferably 2.0 to 12 percent by mass, more preferably 2.0 to 10 percent by mass, and further preferably 2.0 to 7.5 percent by mass. Since the content of the acylphosphine oxide-based photopolymerization initiator is in the range described above, the curing property of the composition and the solubility of the photopolymerization initiator tend to be further improved.

The alkylphenone-based photopolymerization initiator is not particularly limited, and for example, there may be mentioned IRGACURE 127 (2-hydroxy-1-{4-[4-(2-hydroxy-2-methyl-propionyl)-benzyl]phenyl}-2-methyl-propane-1-one), IRGACURE 369 (2-benzyl-2-dimethylamino-1-(4-molpholinophenyl)-butanone-1), IRGACURE 379 (2-dimethylamino-2-[(4-methylphenyl)methyl]-1-[4-(4-molpholinyl)phenyl]-1-butanone), or IRGACURE 907 (2-methyl-1-(4-methylthiophenyl)-2-molpholinopropane-1-one).

The content of the alkylphenone-based photopolymerization initiator with respect to the total mass of the composition is preferably 0.1 to 5.0 percent by mass, more preferably 0.5 to 4.0 percent by mass, and further preferably 1.0 to 3.0 percent by mass. Since the content of the alkylphenone-based photopolymerization initiator is in the range described above, the curing property of the composition tends to be further improved.

1.3. POLYMERIZATION INHIBITOR

Although the polymerization inhibitor is not limited to those mentioned below, for example, there may be mentioned p-methoxyphenol, hydroquinone monomethyl ether (MEHQ), 4-hydroxy-2,2,6,6-tetramethylpiperidine-N-oxyl, hydroquinone, cresol, t-butylcatechol, 3,5-di-t-butyl-4-hydroxytoluene, 2,2'-methylenebis(4-methyl-6-t-butylphenol), 2,2'-methylenebis(4-ethyl-6-butylphenol), 4,4'-thiobis(3-methyl-6-t-butylphenol), a hindered amine compound, 2,2,6,6-tetramethylpiperidinyl-1-oxyl (TEMPO), or its derivative.

The content of the polymerization inhibitor with respect to the total mass of the composition is preferably 0.01 to 0.5 percent by mass and more preferably 0.05 to 0.3 percent by mass. Since the content of the polymerization inhibitor is in the range described above, the storage stability of the composition tends to be further improved.

1.4. SURFACTANT

The surfactant is not particularly limited, and for example, an acetylene glycol-based surfactant, a fluorine-based surfactant, or a silicone-based surfactant may be mentioned.

The acetylene glycol surfactant is not particularly limited, and for example, 2,4,7,9-tetramethyl-5-decyne-4,7-diol, an alkylene oxide adduct thereof, 2,4-dimethyl-5-decyne-4-ol, or an alkylene oxide adduct thereof may be mentioned.

The fluorine-based surfactant is not particularly limited, and for example, there may be mentioned a perfluoroalkyl sulfonate salt, a perfluoroalkyl carboxylate salt, a perfluoroalkyl phosphate ester, a perfluoroalkyl ethylene oxide adduct, a perfluoroalkyl betaine, or a perfluoroalkylamine oxide compound.

As the silicone-based surfactant, for example, there may be mentioned a polysiloxane-based compound, a polyester-modified silicone, or a polyether-modified organosiloxane. As the polyester-modified silicone, for example, BYK-347, 348, BYK-UV3500, 3510, or 3530 (each manufactured by BYK Additives & Instruments) may be mentioned, and as the polyether-modified silicone, for example, BYK-3570 (manufactured by BYK Additives & Instruments) may be mentioned.

The content of the surfactant with respect to the total mass of the composition is preferably 0.1 to 1 percent by mass and more preferably 0.2 to 0.8 percent by mass. Since the content of the surfactant is in the range described above, a wettability of the composition tends to be further improved.

1.5. OTHER COMPONENTS

The radiation curable ink jet composition according to this embodiment may further contain, if needed, a colorant, such as a pigment or a dye, and/or an additive, such as a dispersant for pigment or the like. 2. METHOD FOR MANUFACTURING RADIATION CURABLE INK JET COMPOSITION Manufacturing (preparation) of a radiation curable ink jet composition is performed such that components to be contained in the composition are mixed and stirred so as to be sufficiently uniformly mixed with each other. In this embodiment, the preparation of a radiation curable ink jet composition preferably has, in a preparation process, a step of performing at least one of an ultrasonic treatment and a heating treatment on a mixture in which a polymerization initiator and at least parts of monomers are mixed together. Accordingly, a dissolved oxygen content of the composition after the preparation can be reduced, and a radiation curable ink jet composition excellent in ejection stability and storage stability can be obtained. The mixture described above may be a mixture at least containing the components described above and may be a mixture further containing other components to be contained in the radiation curable ink jet composition or a mixture containing all the components to be contained in the radiation curable ink jet composition. The monomers contained in the mixture may be at least parts of the monomers to be contained in the radiation curable ink jet composition.

3. INK JET METHOD

An ink jet method according to this embodiment includes an ejection step of ejecting the radiation curable ink jet composition described above using a predetermined liquid ejection head so as to be adhered to a recording medium and an emission step of emitting radiation rays to the radiation curable ink jet composition adhered to the recording medium.

3.1 EJECTION STEP

In the ejection step, a heated composition is ejected from the liquid ejection head so as to be adhered to the recording medium. In more particular, a pressure generation device is driven, and the composition filled in a pressure generation chamber of the liquid ejection head is ejected from a nozzle. The ejection method as described above is also called an ink jet method.

As a liquid ejection head 10 used in the ejection step, a line head which performs recording by a line method or a serial head which performs recording by a serial method may be mentioned.

In the line method using a line head, for example, a liquid ejection head having a width larger than a recording width of a recording medium is fixed to an ink jet apparatus. Subsequently, the recording medium is transferred along a sub scanning direction (longitudinal direction or transport direction of the recording medium), and in association with this transfer, ink droplets are ejected from nozzles of the liquid ejection head, so that an image is recorded on the recording medium.

In the serial method using a serial head, for example, a liquid ejection head is mounted on a carriage configured to be transferred in a width direction of a recording medium. Subsequently, the carriage is transferred along a main scanning direction (lateral direction or width direction of the recording medium), and in association with this transfer, ink droplets are ejected from nozzle openings of the head, so that an image can be recorded on the recording medium.

3.2. EMISSION STEP

In the emission step, radiation rays are emitted to the radiation curable ink jet composition adhered to the recording medium. When radiation rays are emitted, the composition is cured since a polymerization reaction of the monomers is started, and hence, a coating film is formed. In this step, when a photopolymerization initiator is present, active species (starting species), such as radicals, acids, and/or bases, are generated, and the polymerization reaction of the monomers is promoted by the function of the starting species. In addition, when a photosensitizer is present, the photosensitizer is excited by absorption of radiation rays and promotes decomposition of the photopolymerization initiator by contact therewith, and the curing reaction can be further performed.

In the case described above, as the radiation rays, for example, ultraviolet rays, infrared rays, visible light rays, or x-rays may be mentioned. By a radiation source provided downstream the liquid ejection head, radiation rays are emitted to the composition. The radiation source is not particularly limited, and for example, an ultraviolet light-emitting diode may be mentioned. By the use of the radiation source as described above, reduction in size and cost of the apparatus can be realized. Since being compact as an ultraviolet ray source, the ultraviolet light-emitting diode can be fitted in the ink jet apparatus.

For example, the ultraviolet light-emitting diode can be fitted to the carriage (at two ends along the medium width direction and/or a medium transport direction side) on which the liquid ejection head to eject the radiation curable ink jet composition is mounted. Furthermore, because of the composition of the radiation curable ink jet composition described above, a high speed curing with low energy can be realized. Radiation energy is calculated by multiplying an emission time by radiation intensity. Hence, the emission time can be decreased, and a printing rate can be increased. On the other hand, the radiation intensity can also be decreased. Accordingly, since a temperature increase of a printed matter can be suppressed, reduction in odor of a cured film may also be obtained.

4. INK JET APPARATUS

An ink jet apparatus of this embodiment includes a liquid ejection head having nozzles which eject a composition and a pressure chamber to which the composition is supplied; and a radiation source which emits radiation rays to the composition, and as the composition, the radiation curable ink jet composition described above is used. In addition, in the liquid ejection head or in an ink flow path, a heating portion which heats the composition on a recording medium may also be provided.

As one example of the ink jet apparatus, in FIGURE, a perspective view of a serial printer is shown. As shown in FIGURE, a serial printer 20 includes a transport portion 220 and a recording portion 230. The transport portion 220 transports a recording medium F supplied to the serial printer to the recording portion 230 and then discharges a recorded recording medium out of the serial printer. In particular, the transport portion 220 has feed rollers and transports a recording medium F fed thereby in a sub scanning direction T1.

In addition, the recording portion 230 includes an ink jet head 231 which ejects the composition to the recording medium F fed from the transport portion 220, a radiation source 232 which emits radiation rays to the composition adhered to the recording medium F, a carriage 234 which mounts those described above, and a carriage transfer mechanism 235 which transfers the carriage 234 in a main scanning direction S1 or S2 of the recording medium F.

In the case of a serial printer, as the ink jet head 231, a head having a length smaller than the width of a recording medium is provided, and by the transfer of the head, multipass recording is performed. In addition, in the serial printer, the head 231 and the radiation source 232 are mounted on the carriage 234 which is transferred in a predetermined direction, and since the head is transferred in association with the transfer of the carriage, the composition is ejected on the recording medium.

Accordingly, recording is performed by at least two passes (multipass). In addition, the pass is also called main scanning. Between the passes, sub scanning which transports the recording medium is performed. That is, the main scanning and the sub scanning are alternately performed.

In addition, in FIGURE, although the case in which the radiation source is mounted on the carriage is shown, the radiation source is not limited thereto and may be not mounted on the carriage.

In addition, the ink jet apparatus of this embodiment is not limited to the above serial type printer and may be the line type printer described above.

4. RECORDED MATTER

A recorded matter of this embodiment is formed from the above radiation curable ink jet composition which is adhered to a recording medium and is then cured. Since the composition described above has preferable stretchability and adhesion, when post processing, such as cutting and/or bending, is performed, the coating film can be suppressed from being cracked and chipped. Hence, the recorded matter of this embodiment may be preferably used for sign application, label application, and the like.

A material of the recording medium is not particularly limited, and for example, there may be mentioned a plastic, such as a poly(vinyl chloride), a poly(ethylene terephthalate), a polypropylene, a polyethylene, a polycarbonate, a cellulose diacetate, a cellulose triacetate, a cellulose propionate, a cellulose butyrate, a cellulose acetate butyrate, a cellulose nitrate, a polystyrene, a poly(vinyl acetal), or a surface-treated plastic selected from those mentioned above; glass, paper, metal, or timber.

EXAMPLES

Hereinafter, although the present disclosure will be described in more detail with reference to examples, the present disclosure is not limited thereto.

1. PREPARATION OF RADIATION CURABLE INK JET COMPOSITION

First of all, a colorant, a dispersant, and some parts of monomers were charged in a pigment-dispersion tank and were then stirred together with ceramic beads each having a diameter of 1 mm, so that a pigment dispersion liquid in which the colorant was dispersed in the monomers was obtained. Subsequently, after the remaining monomers, a photopolymerization initiator, and a polymerization inhibitor were charged in a stainless steel-made container used as a mixture tank and were mixed and stirred so as to be fully dissolved with each other, the pigment dispersion liquid obtained as described above was charged therein in order to have the composition shown in Table 1. Next, the mixture thus obtained was further mixed and stirred for one hour at ordinary temperature and was then filtrated using a 5-μm membrane filter, so that a radiation curable ink jet composition of each example was obtained. In addition, the numerical value of each component shown in each example in the table represents percent by mass.

The abbreviations and the components used in Table 1 are as follows.

MONOFUNCTIONAL MONOMER

PEA (trade name: "Viscoat #192, manufactured by Osaka Organic Chemical Industry Ltd., phenoxyethyl acrylate")
ACMO (manufactured by KJ chemicals Corporation, acryloylmorpholine)
DCPA (manufactured by Hitachi Chemical Co., Ltd., dicyclopentenyl acrylate)
IBXA (manufactured by Osaka Organic Chemical Industry Ltd., isobornyl acrylate)
MUA (manufactured by Tokyo Chemical Industry Co., Ltd., 2-(butylcarbamoyloxy)ethyl acrylate)
SR217 (manufactured by Tokyo Chemical Industry Co., Ltd., tert-butylcyclohexanol acrylate)
4-HBA (manufactured by Osaka Organic Chemical Industry Ltd., 4-hydroxybutyl acrylate)
LA (manufactured by Osaka Organic Chemical Industry Ltd., lauryl acrylate)
INAA (manufactured by Osaka Organic Chemical Industry Ltd., isononyl acrylate) POLYFUNCTIONAL MONOMER
VEEA (manufactured by Nippon Shokubai Co., Ltd., acrylic acid 2-(2-vinyloxyethoxy)ethyl) PHOTOPOLYMERIZATION INITIATOR
TPO-L (manufactured by Accela ChemBio Inc., ethyl (2,4,6-trimethylbenzoyl)phenylphosphinate)
IRGACURE 819 (manufactured by BASF, bis(2,4,6-trimethylbenzoyl)-phenylphosphine oxide)
Speedcure TPO (manufactured by Lambson, 2,4,6-trimethylbenzoyldiphenylphosphine oxide)
Speedcure DETX (manufactured by Lambson, 2,4-diethylthioxanthene-9-one)
IRGACURE 127 (manufactured by BASF, 2-hydroxy-1-{4-[4-(2-hydroxy-2-methyl-propionyl)-benzyl]phenyl}-2-methyl-propane-1-one) POLYMERIZATION INHIBITOR
MEHQ (trade name: "p-methoxyphenol", manufactured by Kanto Chemical Co., Inc., hydroquinone monomethyl ether) SURFACTANT
BYK-UV3500 (manufactured by BYK Additives & Instruments, polyether-modified polydimethylsiloxane having an acryloyl group) COLORANT
Pigment Blue 15:3 (trade name: "C.I. Pigment Blue 15:3", manufactured by DIC Corporation, phthalocyanine blue)

DISPERSANT

Solsperse 36000 (manufactured by Lubrizol, high molecular weight dispersant)

2. EVALUATION METHOD 2.1. Evaluation of Viscosity

By using a rotatory viscometer (trade name: "Rheometer MCR-301", manufactured by Anton Paar), in an environment at 20° C., the viscosity of each radiation curable ink jet composition was measured. The evaluation criteria are as follows.
Evaluation Criteria
  A: viscosity of less than 6 mPa·s
  B: viscosity of 6 to less than 10 mPa·s
  C: viscosity of 10 to less than 15 mPa·s
  D: viscosity of 15 mPa·s or more 2.2. EVALUATION OF ADHESION The radiation curable ink jet composition was applied on a poly(vinyl chloride) film by a bar coater to have a coating thickness of 10 μm, and ultraviolet rays were emitted so as to have a cumulative energy of 200 mJ/cm$^2$ at a certain radiation intensity. In the case described above, as a light source, an LED having a peak wavelength of 395 nm was used. Subsequently, on a coating film (hereinafter, also referred to as "cured film" in some cases) thus obtained, a crosscut test evaluation was performed in accordance with JIS K5600-5-6.

In more particular, a blade of a cutting tool was brought into contact with the coating film at an angle orthogonal thereto, and cutting lines with 1 mm intervals were formed by the blade, so that a lattice having 10×10 squares was formed. After a transparent adhesive tape (width: 25 mm) having a length of approximately 75 mm was adhered to the lattice, the tape was sufficiently rubbed with a finger so that the cured film could be observed through the tape. Subsequently, within 5 minutes after the tape was adhered, the tape was surely peeled away from the cured film in 0.5 to 1.0 second at an angle of approximately 60°, and the condition of the lattice was observed by visual inspection. The evaluation criteria are as follows.

Evaluation Criteria

A: peeling of the cured film is observed in less than 10% of the lattice.

B: peeling of the cured film is observed in 10% to less than 35% of the lattice.
C: peeling of the cured film is observed in 35% or more of the lattice.

2.3. EVALUATION OF ABRASION RESISTANCE

A microscratch test evaluation was performed in accordance with JIS R3255 on the cured coating film formed for the above adhesion evaluation. For the measurement, an ultrathin film scratch tester (CSR-5000, manufactured by Nanotec Corporation) was used, and as the abrasion resistance, a withstand load was measured. For this measurement, microscratch was performed while a load was applied, and a load at which a stylus reached a medium surface was regarded as the withstand load. The measurement was performed using a stylus having a radius of 15 µm at an amplitude of 100 µm and a scratch rate of 10 µm/sec. The evaluation criteria are as follows.

Evaluation Criteria

A: 30 mN/cm$^2$ or more
B: 25 to less than 30 mN/cm$^2$
C: 20 to less than 25 mN/cm$^2$
D: less than 20 mN/cm$^2$

2.4. EVALUATION OF CURING PROPERTY

A cotton swab-rubbing tackiness evaluation was performed. In particular, after the radiation curable ink jet composition was applied to a poly(vinyl chloride) medium by a bar coater so that the ink jet composition had a thickness of 10 µm, ultraviolet rays were emitted at a rate of 0.04 sec/cm and at a predetermined radiation intensity. In this case, as a light source, an LED having a peak wavelength of 395 nm was used. Subsequently, the coating film surface was rubbed with a cotton swab, and the curing property of the composition was evaluated based on radiation energy by which the cotton swab was not colored. The evaluation criteria are as follows.

Evaluation Criteria

A: Radiation energy of less than 200 mJ/cm$^2$
B: Radiation energy of 200 to less than 350 mJ/cm$^2$
C: Radiation energy of 350 to less than 500 mJ/cm$^2$
D: Radiation energy of 500 mJ/cm$^2$ or more

TABLE 1

| | | Tg | SP VALUE | EXAMPLE 1 | 2 | 3 | 4 | 5 | 6 | 7 | 8 | 9 | 10 | 11 | 12 | COMPARATIVE EXAMPLE 1 | 2 |
|---|---|---|---|---|---|---|---|---|---|---|---|---|---|---|---|---|---|
| MONO-FUNCTIONAL MONOMER | PEA | −22 | 9.99 | 34.4 | 29.4 | 29.4 | 25.4 | 25.4 | 25.4 | 29.0 | 31.7 | 34.4 | 10.0 | 11.4 | 34.4 | 34.4 | 24.4 |
| | ACMO | 145 | 11.55 | 12.0 | 19.0 | 13.0 | 12.0 | 12.0 | 12.0 | 12.0 | 12.0 | 21.0 | 12.0 | 20.0 | 12.0 | 12.0 | 12.0 |
| | DCPA | 110 | 10.53 | 5.0 | 0.0 | 5.0 | 5.0 | 5.0 | 5.0 | 5.0 | 5.0 | 5.0 | 5.0 | 5.0 | 5.0 | 5.0 | 5.0 |
| | IBXA | 94 | 7.24 | 25.0 | 25.0 | 28.0 | 26.0 | 25.0 | 26.0 | 25.0 | 25.0 | 16.0 | 25.0 | 10.0 | 25.0 | 25.0 | 25.0 |
| | MUA | −3 | 11.57 | 3.0 | 3.0 | 3.0 | 3.0 | 3.0 | 3.0 | 3.0 | 3.0 | 3.0 | 1.0 | 3.0 | 3.0 | 3.0 | 3.0 |
| | SR217 | 10 | 7.78 | | | 3.0 | | | | | | | 10.0 | | | | |
| | 4-HBA | −32 | 11.31 | | | | 8.0 | | | | | | | 30.0 | | | |
| | LA | −23 | 8.36 | | | | | 9.0 | | | | | | | | | |
| | INAA | −58 | 8.33 | | | | | | 8.0 | | 2.7 | | 14.4 | | | | |
| POLY-FUNCTIONAL MONOMER | VEEA | 39 | 9.41 | 5.0 | 5.0 | 8.0 | 5.0 | 5.0 | 5.0 | 5.0 | 5.0 | 5.0 | 7.0 | 5.0 | 5.0 | 5.0 | 9.0 |
| POLY-MERIZATION INHIBITOR | MEHQ | | | 0.1 | 0.1 | 0.1 | 0.1 | 0.1 | 0.1 | 0.1 | 0.1 | 0.1 | 0.1 | 0.1 | 0.1 | 0.1 | 0.1 |
| PHOTOPOLY-MERIZATION INITIATOR | TPO-L | | | 5.0 | 5.0 | 5.0 | 5.0 | 5.0 | 5.0 | 10.4 | 5.0 | 5.0 | 5.0 | 5.0 | 5.0 | | 11.0 |
| | Irgacure819 | | | 5.0 | 5.0 | 5.0 | 5.0 | 5.0 | 5.0 | 5.0 | 5.0 | 5.0 | 5.0 | 5.0 | 3.0 | 5.0 | 5.0 |
| | Speedcure TPO | | | 0.0 | 0.0 | 0.0 | 0.0 | 0.0 | 0.0 | 0.0 | 0.0 | 0.0 | 0.0 | 0.0 | 0.0 | 5.0 | 0.0 |
| | Speedcure DETX | | | 3.0 | 3.0 | 3.0 | 3.0 | 3.0 | 3.0 | 3.0 | 3.0 | 3.0 | 3.0 | 3.0 | 3.0 | 3.0 | 3.0 |
| | Igacure 127 | | | | | | | | | | | | | | 2.0 | | |
| SURFACTANT | BYK UV3500 | | | 0.5 | 0.5 | 0.5 | 0.5 | 0.5 | 0.5 | 0.5 | 0.5 | 0.5 | 0.5 | 0.5 | 0.5 | 0.5 | 0.5 |
| COLORANT | Pigment Blue 15:3 | | | 1.8 | 1.8 | 1.8 | 1.8 | 1.8 | 1.8 | 1.8 | 1.8 | 1.8 | 1.8 | 1.8 | 1.8 | 1.8 | 1.8 |
| DISPERSANT | solsperse 36000 | | | 0.2 | 0.2 | 0.2 | 0.2 | 0.2 | 0.2 | 0.2 | 0.2 | 0.2 | 0.2 | 0.2 | 0.2 | 0.2 | 0.2 |
| | TOTAL | | | 100.0 | 100.0 | 100.0 | 100.0 | 100.0 | 100.0 | 100.0 | 100.0 | 100.0 | 100.0 | 100.0 | 100.0 | 100.0 | 100.0 |
| RATE OF MONOFUNCTIONAL MONOMER TO TOTAL OF POLYMERIZABLE COMPOUNDS (PERCENT BY MASS) | | | | 94 | 94 | 91 | 94 | 94 | 94 | 94 | 94 | 94 | 92 | 94 | 94 | 94 | 89 |
| WEIGHTED AVERAGE SP VALUE | | | | 9.5 | 9.5 | 9.4 | 9.5 | 9.3 | 9.3 | 9.4 | 9.4 | 9.9 | 8.9 | 10.6 | 9.5 | 9.5 | 9.4 |
| WEIGHTED AVERAGE GLASS TRANSITION TEMPERATURE (° C.) | | | | 48.2 | 55.4 | 53.7 | 48.6 | 48.1 | 46.2 | 53.0 | 47.1 | 53.7 | 46.9 | 39.9 | 48.2 | 48.2 | 56.7 |
| EVALUATION ITEM | VISCOSITY | | | B | B | A | A | A | A | B | A | B | A | B | B | C | A |
| | ADHESION | | | A | A | A | A | A | A | A | A | A | B | B | A | A | C |
| | ABRASION RESISTANCE | | | A | A | A | A | A | A | A | B | B | C | A | A | A | A |
| | CURING PROPERTY | | | B | B | B | B | B | B | A | B | B | B | B | B | B | A |

3. EVALUATION RESULTS

In Table 1, the compositions of the radiation curable ink jet compositions used in the examples and the evaluation results thereof are shown. From the comparison between each example and Comparative Example 1, it is found that since the degree of freedom in monomer design is improved by using ethyl (2,4,6-trimethylbenzoyl)phenylphosphinate, the viscosity of the composition can be decreased. In addition, from the comparison between each example and Comparative Example 2, it is found that when the content of the monofunctional monomers with respect to the total mass of the polymerizable compounds is set to 90 percent by mass or more, the adhesion of the coating film is further improved.

What is claimed is:

1. A radiation curable ink jet ink composition comprising:
polymerizable compounds; and
a photopolymerization initiator,
wherein the polymerizable compounds include a monofunctional monomer,
the photopolymerization initiator includes ethyl (2,4,6-trimethylbenzoyl)phenylphosphinate, and
the monofunctional monomer includes a nitrogen-containing monofunctional acrylate monomer having a nitrogen-containing heterocyclic structure, a content of the nitrogen-containing monofunctional acrylate monomer having the nitrogen-containing heterocyclic structure being 25% by mass or less with respect to the total mass of the radiation curable ink jet ink composition.

2. The radiation curable ink jet ink composition according to claim 1,
wherein the monofunctional monomer includes an aromatic group-containing monofunctional monomer, and
a content of the aromatic group-containing monofunctional monomer with respect to the total mass of the polymerizable compounds is 30 percent by mass or less.

3. The radiation curable ink jet ink composition according to claim 1,
wherein when content mass ratios of the polymerizable compounds are regarded as their respective weights, a weighted average of glass transition temperatures of homopolymers derived from the respective polymerizable compounds is 48° C. or more.

4. The radiation curable ink jet ink composition according to claim 1,
wherein
content of the nitrogen-containing monofunctional acrylate monomer having the nitrogen-containing heterocyclic structure with respect to a total mass of the radiation curable ink jet composition is 5.0 to 25 percent by mass.

5. The radiation curable ink jet ink composition according to claim 1,
wherein the nitrogen-containing monofunctional acrylate monomer having the nitrogen-containing heterocyclic structure includes acryloylmorpholine.

6. The radiation curable ink jet ink composition according to claim 1,
wherein the polymerizable compounds include a polyfunctional monomer, and
a content of the polyfunctional monomer with respect to the total mass of the polymerizable compounds is 10 percent by mass or less.

7. The radiation curable ink jet ink composition according to claim 1,
wherein a content of ethyl (2,4,6-trimethylbenzoyl)phenylphosphinate with respect to a total mass of the radiation curable ink jet composition is 2.0 percent by mass or more.

8. The radiation curable ink jet ink composition according to claim 1,
wherein when content mass ratios of the polymerizable compounds are regarded as their respective weights, a weighted average of SP values of the polymerizable compounds is 9.0 to 10.5.

9. The radiation curable ink jet ink composition according to claim 1,
wherein the monofunctional monomer includes an aliphatic group-containing monofunctional monomer represented by the following general formula (1)

$$H_2C=CR^1-CO-O-R^2 \qquad (1)$$

where in the formula (1), $R^1$ represents a hydrogen atom or a methyl group, and $R^2$ represents a linear or branched aliphatic group having 4 to 20 carbon atoms.

10. The radiation curable ink jet ink composition according to claim 1,
wherein the monofunctional monomer includes a hydroxy group-containing monofunctional monomer.

11. The radiation curable ink jet ink composition according to claim 1,
wherein the polymerizable compounds include a urethane acrylate.

12. An ink jet method comprising:
an ejection step of ejecting the radiation curable ink jet ink composition according to claim 1 by a liquid ejection head so as to be adhered to a recording medium; and
an emission step of emitting radiation rays to the radiation curable ink jet composition adhered to the recording medium.

13. The radiation curable ink jet ink composition according to claim 1, wherein the plurality of polymerization initiators includes an acylphosphine oxide-based photopolymerization initiator different from the ethyl (2,4,6-trimethylbenzoyl)phenylphosphinate.

14. The radiation curable ink jet ink composition according to claim 1, the monofunctional monomer includes an alicyclic group-containing monofunctional monomer.

* * * * *